US008004998B2

(12) United States Patent
Levy et al.

(10) Patent No.: US 8,004,998 B2
(45) Date of Patent: Aug. 23, 2011

(54) CAPTURE AND REGENERATION OF A NETWORK DATA USING A VIRTUAL SOFTWARE SWITCH

(75) Inventors: Joseph H Levy, Eagle Mountain, CA (US); Matthew Scott Wood, Salt Lake City, UT (US); Paal Tveit, Salt Lake City, UT (US); Brian Edginton, West Jordan, UT (US); Steve Shillingford, Lindon, UT (US); James Brown, Lindon, UT (US)

(73) Assignee: Solera Networks, Inc., South Jordan, UT (US)

( * ) Notice: Subject to any disclaimer, the term of this patent is extended or adjusted under 35 U.S.C. 154(b) by 145 days.

(21) Appl. No.: 12/471,437

(22) Filed: May 25, 2009

(65) Prior Publication Data
US 2009/0290501 A1 Nov. 26, 2009

Related U.S. Application Data

(60) Provisional application No. 61/055,908, filed on May 23, 2008.

(51) Int. Cl.
*H04L 12/26* (2006.01)
*G06F 7/04* (2006.01)

(52) U.S. Cl. .............................. 370/250; 726/3; 726/22

(58) Field of Classification Search ...................... None
See application file for complete search history.

(56) References Cited

U.S. PATENT DOCUMENTS

| 6,708,292 | B1 * | 3/2004 | Mangasarian ................... 714/39 |
| 7,617,314 | B1 * | 11/2009 | Bansod et al. ................. 709/224 |
| 7,904,726 | B2 * | 3/2011 | Elgezabal ....................... 713/176 |
| 2005/0063320 | A1 * | 3/2005 | Klotz et al. .................... 370/254 |
| 2005/0229255 | A1 * | 10/2005 | Gula et al. ........................ 726/23 |
| 2005/0265248 | A1 * | 12/2005 | Gallatin et al. ............... 370/250 |
| 2007/0140235 | A1 * | 6/2007 | Aysan et al. ................... 370/389 |
| 2008/0056144 | A1 * | 3/2008 | Hutchinson et al. ........... 370/250 |
| 2009/0245114 | A1 * | 10/2009 | Vijayaraghavan ............. 370/241 |
| 2009/0290580 | A1 * | 11/2009 | Wood et al. .................... 370/389 |
| 2009/0292681 | A1 * | 11/2009 | Wood et al. ......................... 707/3 |
| 2010/0278052 | A1 * | 11/2010 | Matityahu et al. ............. 370/250 |

* cited by examiner

*Primary Examiner* — Min Jung
(74) *Attorney, Agent, or Firm* — Dorsey & Whitney LLP

(57) ABSTRACT

Methods and a system of capture and regeneration of a network data using a virtual software switch are disclosed. In an embodiment, a method includes capturing a network data using a virtual software switch, a processor, and a memory. The network data is captured to perform a network visibility analysis and the network data is communicated to at least one port of the virtual software switch. The method includes forming a stored network data in a memory. The method also includes regenerating the stored network data to form a reconstructed data.

21 Claims, 11 Drawing Sheets

| ARTIFACT 402 | START BITS 404 | LENGTH 406 | END BITS 408 | ENCRYPTED 410 | OTHER 412 |
|---|---|---|---|---|---|
| WORD PROCESSING DOC | 4 BITS 1011 | 2 BITS 16 | 4 BITS 1001 | YES | REPEATS EVERY TWO INTERVALS |
| SPREAD SHEET FILE | 3 BITS 110 | 24 BITS | 2 BITS 11 | NO | THREE PERIODS |
| IMAGE | 6 BITS 111011 | 32 BITS | 6 BITS 100110 | NO | IDENTIFIES BITS IN HEADER |
| VIDEO | 8 BITS 01011000 | 64 BITS | 4 BITS 1010 | YES | SEQUENCE SHIFTS |
| • | • | • | • | • | • |
| • | • | • | • | • | • |
| • | • | • | • | • | • |

TABLE 450

CAPTURE AND REGENERATION OF A NETWORK DATA USING A VIRTUAL SOFTWARE SWITCH

CLAIM OF PRIORITY

This application claims the benefit of U.S. Provisional Application No. 61/055,908, filed on May 23, 2008.

FIELD OF TECHNOLOGY

This disclosure relates generally to a technical field of software, hardware and/or networking technology, and in particular to capture and regeneration of a network data using a virtual software switch.

BACKGROUND

A virtual software switch may be used to transfer data between virtual and/or physical machines. Data may be transferred directly between targeted machines, but additional software and/or hardware may be needed to capture a network data communicated between the virtual and/or physical machines communicatively coupled to the virtual software switch. The additional hardware and/or software needed to capture the network data may add a delay and/or a cost to an operation to monitor the network data. As a result, a limited portion of the data communicated across a network may be reviewed, potentially allowing a security rule to be breached. The breach of the security rule may result in a loss of revenue, a loss of worker productivity, and/or a loss of revenue associated with trade secret information.

SUMMARY

Methods and a system of capture and regeneration of a network data using a virtual software switch are disclosed. In an aspect, a method includes capturing a network data using a virtual software switch, a processor, and a memory. The network data is communicated to at least one port of the virtual software switch. The method also includes forming a stored network data in a memory. The method further includes regenerating the stored network data to form a reconstructed data. The method also includes performing a network visibility analysis using the reconstructed data.

The method may include aggregating a payload data from the network data, wherein the network data is comprised of different packets. The method may also include generating an extracted artifact of a network data using the aggregated payload data. The method may further include communicating the reconstructed data at a variable communication rate. The method may also include communicating the reconstructed data at an upper threshold rate. In addition, the method may include communicating the reconstructed data at an lower threshold rate. The method may include communicating the reconstructed data at an intermittent rate.

The method may also include controlling an ingress location filter of a virtual software switch. The method may further include regulating an egress location filter of a virtual software switch to control a flow of network data. The method may, in addition, include applying an access control list to at least one of the control of the ingress location filter and the regulation of the egress location filter of the virtual software switch.

The memory may include a virtual storage device communicatively coupled to the virtual software switch. The method may include trunking the reconstructed data of the virtual software switch to a remote location. The reconstructed data may be communicated to at least one of a physical network and a virtual network.

The method may include matching the payload data with an entry of a library of known artifacts. The method may also include determining a type of the payload data based on a match with the entry of the library of known artifacts. The extracted artifact may include one or more of a word processing document, a spreadsheet document, a database, an image, a video, a multimedia file, an email, an instant message communication, an audio file, a compressed file, an executable file, a web page, a raw data, a metadata, and a presentation.

In another aspect, a system includes a virtual software switch to capture a network data using a processor and a memory. The network data is captured to perform a network visibility analysis and the network data is communicated to at least one port of the virtual software switch. The system further includes an additional memory to store the network data and a regeneration module to form a reconstructed data using the stored network data.

The system may include a virtual appliance to aggregate a payload data from the network data. The network data may be comprised of different packets. The system further includes an extraction module to form an extracted artifact using the aggregated payload data. The extracted artifact may include one or more of a word processing document, a spreadsheet document, a database, an image, a video, a multimedia file, an email, an instant message communication, an audio file, a compressed file, an executable file, a web page, a raw data, a metadata, and a presentation.

The reconstructed data may be formed using a variable communication rate. The variable communication rate may include one or more of a real time, an upper rate, a lower rate, and a customizable rate. The system may further include a transfer control module to filter the network data using at least one of an ingress location and an egress location of the virtual software switch.

In yet another aspect, a method includes capturing a network data using a virtual software switch, a processor, and a memory. The network data is captured to perform a network visibility analysis and the network data is communicated to at least one port of the virtual software switch. The method includes aggregating a payload data from the network data, wherein the network data is comprised of different packets. The method further includes generating an extracted artifact using the aggregated payload data. The extracted artifact includes one or more of a word processing document, a spreadsheet document, a database, an image, a video, a multimedia file, an email, an instant message communication, an audio file, a compressed file, an executable file, a web page, a raw data, a metadata, and a presentation.

The method includes forming a stored network data in a virtual storage device communicatively coupled to the virtual software switch. The method also includes regenerating the stored network data to form a reconstructed data. The reconstructed data is formed using a variable communication rate that includes one or more of a real time, an upper rate, a lower rate, and a customizable rate. The reconstructed data is communicated to at least one of a physical network and a virtual network.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the disclosure that follows.

DETAILED DESCRIPTION

Methods and a system of capture and regeneration of a network data using a virtual software switch are disclosed. In the following description, for the purposes of explanation, numerous specific details are set forth in order to provide a thorough understanding of the various embodiments. It may be evident, however, to one skilled in the art that the various embodiments may be practiced without these specific details.

Figure 1:
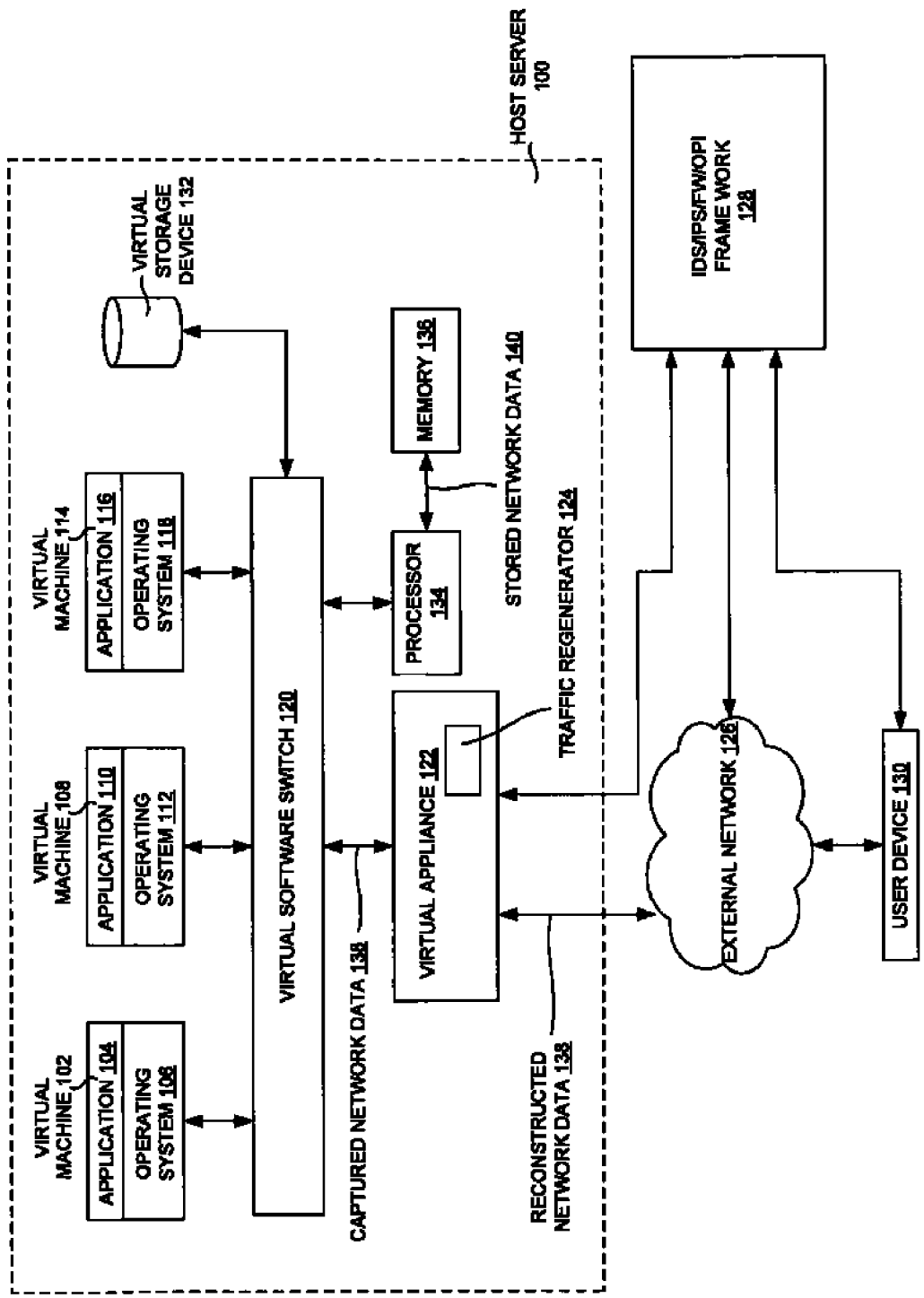
FIG. 1 is a system view of a host device (e.g., that includes virtual machines) communicating with a user device through an external network, according to one embodiment.

FIG. 1 is a system view of a virtual software switch communicating with a virtual appliance, according to one embodiment. Particularly, FIG. 1 illustrates a host server 100, a virtual machine 102, an application 104, an operating system 106, a virtual machine 108, an application 110, an operating system 112, a virtual machine 114, an application 116, an operating system 118, a virtual software switch 120, a virtual appliance 122, a traffic regenerator 124, an external network 126, a framework 128, an user device 130, and a virtual storage device 132, according to one embodiment.

The host server 100 may be a data processing device (e.g., may be a computer) on a network that is a repository for services available to other computers on the network. The virtual machine 102, 108 and 114 (e.g., may be runtime environment) may be a machine that may be completely defined and implemented in software in the host server 100. The application 104, 110 and 116 may be software managed by the virtual machine 102. The operating system 106, 112 and 118 may optimize the client/server architecture, provides and supports network services such as file services, e-mail, Internet and intranet services, and other applications.

The virtual software switch 120 may be a switch that may enable the virtual machine 102 to communicate with another virtual machine. The virtual software switch 120 may operate in a promiscuous mode, in which a port may be allowed to see traffic relating to another port. The promiscuous mode may allow a port to monitor network traffic that passes through the virtual software switch, between specific ports, or that are filtered at an ingress and/or egress location of the virtual software switch.

The virtual software switch 120 may be used to capture a network data that is communicated to a port of the virtual software switch 120 using a processor and a memory. The captured network data may be stored in a nonvolatile memory, a RAID array, a local storage device, a virtual storage device, or any other storage location.

The virtual software switch 120 may capture network data in storage in real time or in near real time. The virtual software switch 120 may utilize an ingress location filter and/or an egress location filter to control the data passed through the virtual software switch 120. The virtual software switch 120 may also include other functions, such as the use of an access control list, controlling particular port ranges, link speed and/or duplex settings priority settings for ports, MAC filtering and/or other types of "port security" features which prevent MAC flooding, use of Spanning Tree Protocol, SNMP monitoring of device and/or link health, port mirroring, link aggregation, VLAN settings, 802.1X network access control.

After it has been captured, the network data may be regenerated using a traffic regenerator 124 of a virtual appliance 122. The virtual appliance 122 may be a virtual machine image designed to run under Parallels, VMware, Xen, Microsoft Virtual PC, QEMU, Usermode Linux, CoLinux, Virtual Iron, VirtualBox or other virtualization technology. A port of the virtual software switch may be trunked to a remote location, such as an external network 126, a remote device, a wireless receiver, a terminal, etc. The external network 126 may be any other network (e.g., internet, WANs, private networks, virtual, hardware, etc.) that may enable communication between the user device 130, the host server 100 and framework 128.

The framework 128 (e.g., frameworks of IDS, IPS, FW, OPI, etc.) may be a support structure which may be used by the virtual appliance 122 for managing the host server 100. The user device 130 may be a data processing system (e.g., computer, mobile device, etc.) that may communicate with the host server 100 through the external network 126. The virtual storage device 132 may be a database that may store data (e.g., packet) and associated information such as metadata, etc.

Regeneration of data at a port may be used to simulate port mirroring and/or spanning. The reconstructed data may be communicated at a variety of rates, including realtime, an upper threshold rate, a lower threshold rate, an intermittent rate, or any other rate. The upper threshold rate may be a maximum output rate of the virtual software switch 120 or a maximum receiver rate of a receiving device. The lower threshold rate may be zero transmission, or it may be a threshold that is preferred for a transmission. The intermittent rate may permit pauses to be introduced into the reconstructed data transmission.

In an example embodiment, the host server 100 may communicate with the user device 130 through the external network 126. The host server 100 may make use of the framework 128 to operate the virtual appliance 122. The host server 100 may include the virtual machine 102, 108, and 114, the virtual software switch 120, the traffic regenerator 124, and the virtual storage device 132. The virtual machine 102, 108 and 114 may include applications and operating systems. The framework 128 may be used by the virtual appliance 122.

Figure 2:
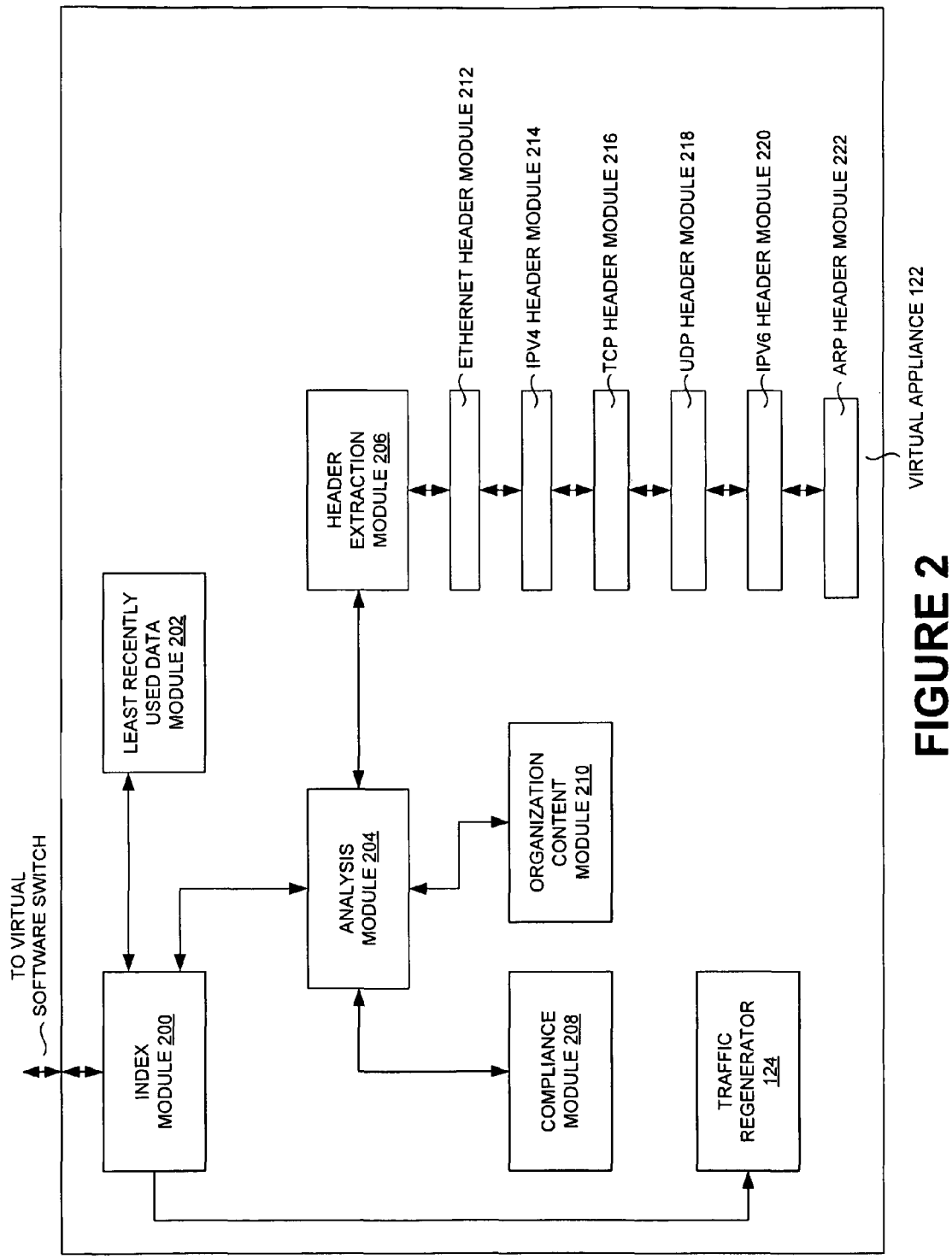
FIG. 2 is an exploded view of virtual appliance of FIG. 1, according to one embodiment.

FIG. 2 is an exploded view of the virtual appliance of FIG. 1, according to one embodiment. Particularly, FIG. 2 illustrates an index module 200, a least recently used data module 202, an analysis module 204, a header extraction module 206, a compliance module 208, an organization content module 210, an Ethernet header module 212, an IPv4 header module 214, a TCP header module 216, a UDP header module 218, an IPv6 header module 220, an ARP header module 222 and to virtual software switch 224, according to one embodiment.

The index module 200 may communicate (e.g., transmit, receive, etc.) the data packets based on an index (e.g., logical sequences). The least recently used data module 202 may apply a least recently used algorithm to discard information from the storage device when storage device is limited in the storage capacity. The analysis module 204 may analyze (e.g., check, verify, etc.) the packet 550 having a header 502 and a payload 504 in a flow of the data through a network. The header extraction module 206 may extract the header content of the data packet (e.g., that may contain meta-data and other meta-data). The compliance module 208 may check for the compliance requirement for storing meta-data and other meta-data in the storage devices. The organization content module 210 may check for organization content in the data that may be communicated from/to the external network 126.

The Ethernet header module 212 may use the meta-data of the Ethernet header to associate the flow of the data through the network to a physical computing device associated with a user. The IPv4 header module 214 may determine which entity on the network (e.g., which website, which server, etc.) was accessed through the meta-data and how much total traffic was sent by a particular user of the network in a session by analyzing the meta-data in the IPv4 header. The TCP header module 216 may determine what kind of activity a particular user engaged in (e.g., web traffic, ftp, instant message traffic, etc.) and may permit a reconstruction of an artifact (e.g., a file, a photo, etc.) through an analysis of the meta-data of the TCP header.

The UDP header module 218 may determine that a particular user engaged in (e.g., one line game playing, name server lookups, hacking, etc.) an unauthorized activity and may permit a reconstruction of an artifact (e.g., a file, a photo, etc.) through an analysis of the meta-data of the UDP header and other header. The IPv6 header module 220 may determine which entity on the network (e.g., which website, which server, etc.) was accessed through the meta-data and how much total traffic was sent by a particular user of the network in a session by analyzing the meta-data in the IPv6 header. The ARP header module 222 may determine that a particular user engaged in (e.g., ARP poisoning, etc.) an unauthorized activity and may enable reconstructing the unauthorized activity (e.g., for attack prevention and attack detection) through an analysis of the meta-data of the ARP header.

In an example embodiment, FIG. 2 illustrates the analysis module 204 that may communicate with the organization content module 210, the header extraction module 206, the index module 200 and/or the compliance module 208. The header extraction module 206 may extract the header (Ethernet header module 212, the IPv4 header module 214, TCP header module 216, UDP header module 218, IPv6 header module 220, and/or ARP header module 222) from the packet 550.

Figure 3:
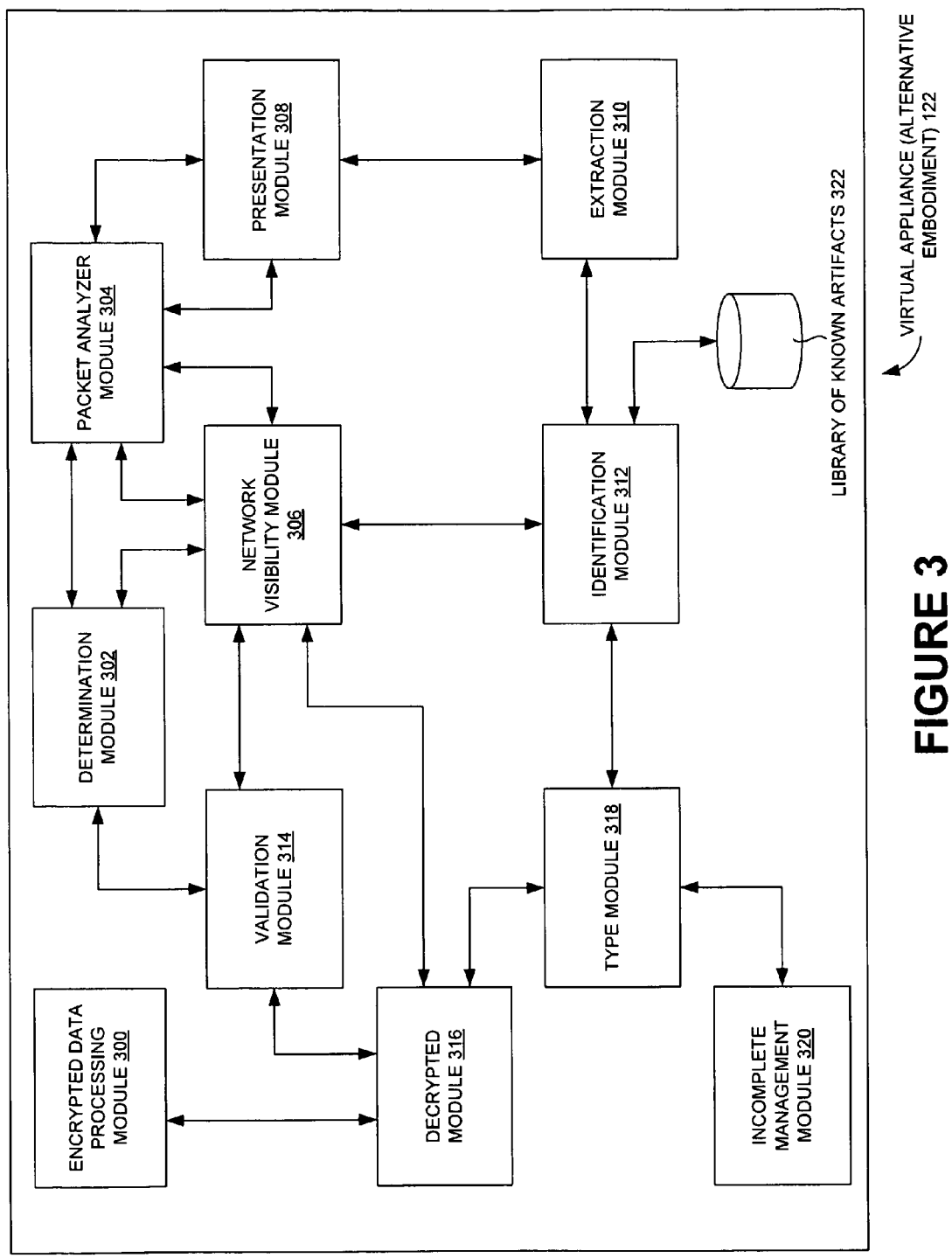
FIG. 3 is an exploded view of virtual appliance (alternative embodiment) of FIG. 1, according to one embodiment.

FIG. 3 is an alternative exploded view of the virtual appliance, according to one embodiment. Particularly, FIG. 3 illustrates an encrypted data processing module 300, a determination module 302, a packet analyzer module 304, a network visibility module 306, a presentation module 308, an extraction module 310, an identification module 312, a validation module 314, a decrypted module 316, a type module 318, an incomplete management module 320, and a library of known artifacts 322, according to one embodiment.

The encrypted data processing module 300 may generate a request for the encrypted data (e.g., in the payload) from a source on behalf of a requester and/or to receive a decryption key on a network appliance. The determination module 302 may determine (e.g., verify, validate) that the payload data 606A-N is encrypted. The packet analyzer module 304 may separate the payload data 606A-N (e.g., that may contain artifact component) from the header data (e.g., that may contain information associated to the payload and other details) in the network packet. The network visibility module 306 may perform a network visibility analysis (e.g., verify, check) of users on packets flowing across the network using the extracted artifact. The presentation module 308 may aggregate the payload data 506 (e.g., which may have different artifact components) from different network packets to form an aggregated payload data 500 (e.g., the aggregated payload data 600 of FIG. 6). The extraction module 310 may communicate (e.g., transfer) the aggregated payload data 500 as an extracted artifact (e.g., the spreadsheet, etc.) to a user (e.g., a client device 102A-N). The identification module 312 may match the payload data 606A-N with an entry of a library of known artifacts 322. The validation module 314 may verify that the entry (e.g., entry of the library of known artifacts 322) is accurate by performing a deeper analysis of the payload data 606A-N with the entry of the library of known artifacts.

The decrypted module 316 may apply the decryption key (e.g., a right code) to decrypt the encrypted data on the network appliance. The type module 318 may determine a type of the payload data 506 based on a match with the entry in the library of known artifacts 322. The incomplete management module 320 may determine that the artifact (e.g., that may contain the data) is incomplete, and/or may communicate (e.g., transmit) a portion of the incomplete artifact to the user (e.g., to the client device). The library of known artifacts 322 may be a database that may have all the information about the various artifacts that may possibly used by the client device 102A-N.

In an example embodiment, the network visibility module 306 may communicate with the packet analyzer module 304, the determination module 302, the validation module 314, the identification module 312 and the decrypted module 316. The determination module 302 may communicate with the validation module 314. The packet analyzer module 304 may communicate with the presentation module 308. The presentation module 308 may communicate with the extraction module 310. The extraction module 310 may communicate with the identification module 312. The identification module 312 may communicate with the library of known artifacts and the type module 318. The type module 318 may communicate with the incomplete management module 320 and the decrypted module 316. The decrypted module 316 may communicate with the encrypted data processing module 300.

Figure 4:
FIG. 4 is a table view illustrating information (e.g., start bits, length, etc.) associated to a packet, according to one embodiment.

FIG. 4 is a table view illustrating information associated with a packet, according to one embodiment. Particularly, FIG. 4 illustrates an artifact field 402, start bits field 404, length field 406, end bits field 408, encrypted field 410 and other field 412, according to one embodiment.

The artifact field 402 may illustrate the type of artifacts in the payload data 506. The start bits field 404 may illustrate a first state that indicates start of a sequence of data block bits. The length field 406 may illustrate the length of the payload 504. The end bits field 408 may illustrate the end bits that may mark the end of the packet and/or preamble bit for the subsequent packet. The encrypted field 410 may illustrate whether the payload data 506 is encrypted or not. The other field 412 may illustrate the other information associated to the artifacts.

In an example embodiment, FIG. 4 illustrates table view 450. The artifact field 402 may illustrate "word processing document" in first row, "spreadsheet file" in second row, "image" in third row, and "video" in fourth row. The start bits filed 404 may illustrate "4 bits as 1011" in first row, "4 bits as 110" in second row, "6 bits as 111011" in third row, and "8 bits as 01011000" in fourth row. The length field 406 may illustrate "16 bits" in the first row, "24 bits" in the second row, "32 bits" in the third row, and "64 bits" in the fourth row. The end bits field 408 may illustrate "4 bits as 1001" in the first row, "2 bits as 11" in the second row, "6 bits as 100110" in the third row, and "4 bits as 1010" in the fourth row. The encrypted field 418 may illustrate "yes" in the first row, "no" in the second row, "no" in the third row, and "yes" in the fourth row. The other field 412 may illustrate "repeats every two intervals" in the first row, "three periods" in the second row, "identifier bits in header" in the third row, and "sequence shifts" in the fourth row.

Figure 5:
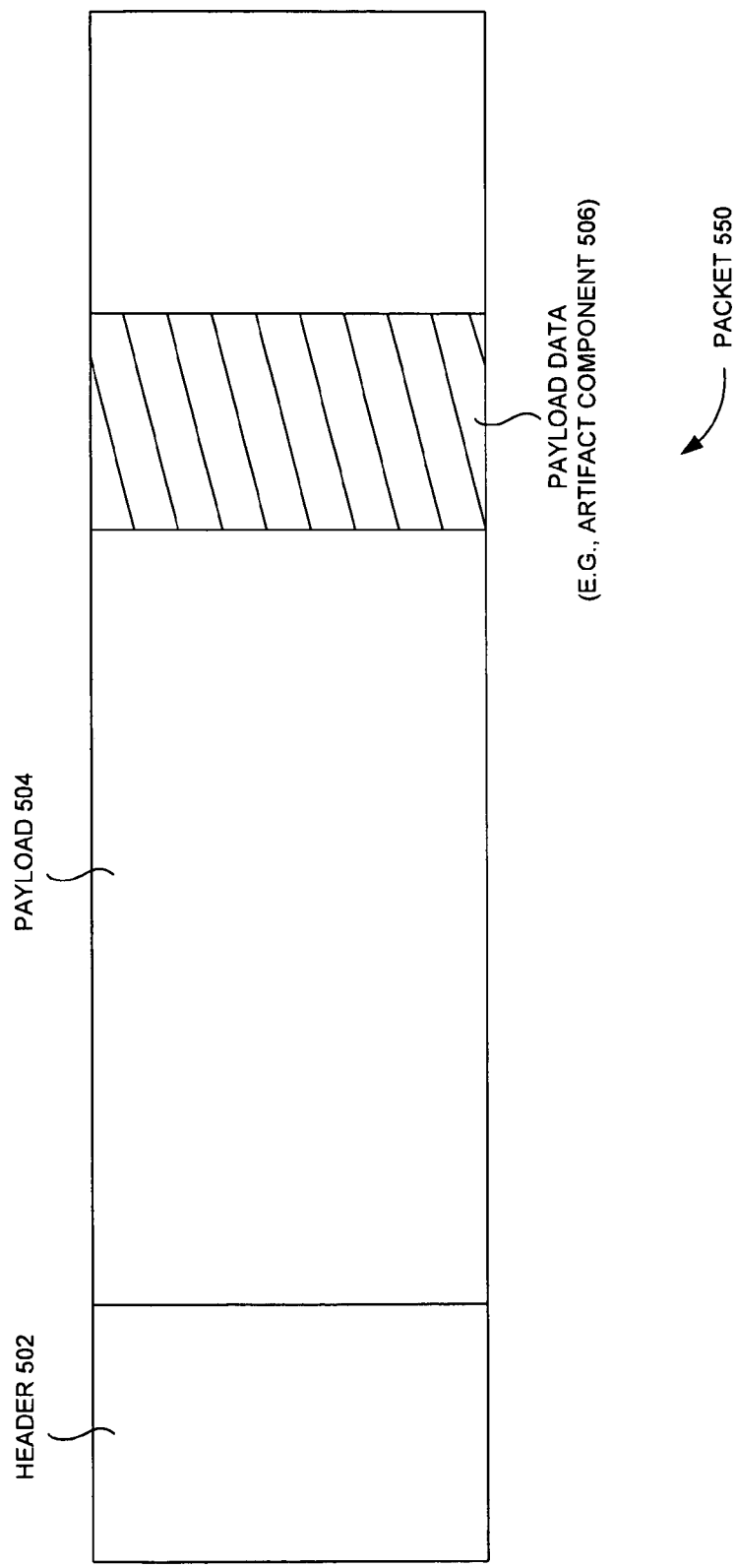
FIG. 5 is a structural view of a packet, according to one embodiment.

FIG. 5 is a structural view of a packet, according to one embodiment. Particularly, FIG. 5 illustrates a header 502, a payload 504, and a payload data 506, according to one embodiment.

The header 502 may have instructions (e.g., length of packet, packet number, synchronization, protocol, destination address, originating address, meta-data, etc.) associated to the data carried by the packet 550. The payload 504 may be a part of the packet 550 that carries actual data. The payload data 506 may contain the data (e.g., the artifact component) described by the next header field.

In an example embodiment, FIG. 5 illustrates the structure if the packet 550 that may include the header 502, the payload 504, and the payload data 506. The header 502 may contain all the necessary information associated to the packet 550. The payload may be a part of the packet 550 which may contain data (e.g., artifact, etc.) and other information associated to the data. The payload data 506 may have the actual artifact and information that would have been described in the header 502.

Figure 6:
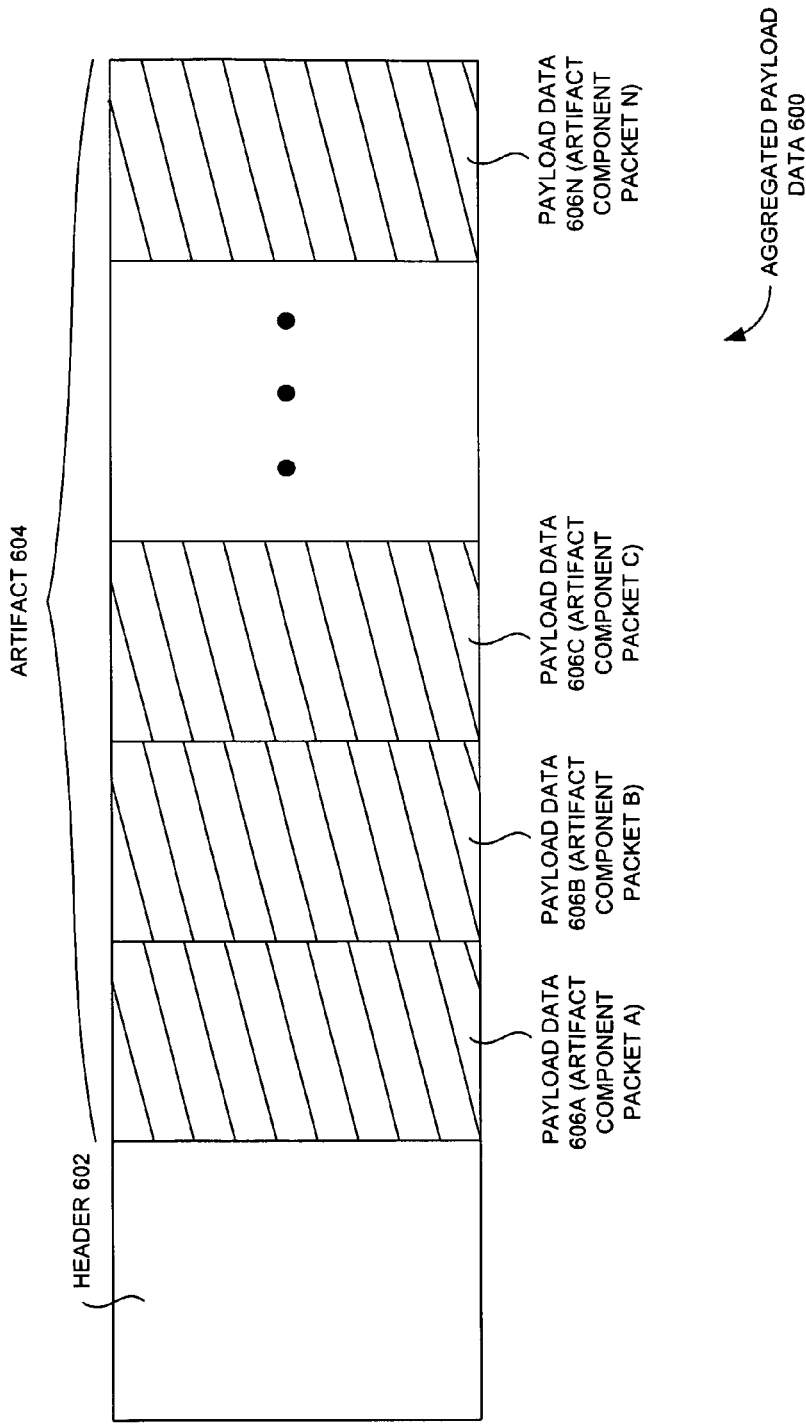
FIG. 6 is a structural view of an aggregated payload data, according to one embodiment.

FIG. 6 is a structural view of an aggregated payload data, according to one embodiment. Particularly, FIG. 6 illustrates an aggregated payload data 600, a header 602, an artifact 604, and payload data 606A-N, according to one embodiment.

The aggregated payload data 600 may be a collection of payload data that may be aggregated from the network packets. The header 602 may include information associated to the aggregated payload data 600 along with the other data (e.g., sequence number, packet length, etc.). The artifact 604 may be a data chunk (e.g., packets of data of an email, an instant message communication, an audio file, a compressed file, etc.) that may be carried by the packet that flows in the network. The payload data 606A-N may be a collection of payload data (e.g., that may include a word processing document, a spreadsheet document, a database, an image, a video, a multimedia file, an email, an instant message communication, an audio file, a compressed file, an executable file, a web page, a presentation, etc.) that may be aggregated form the network packets.

In an example embodiment, FIG. 6 illustrates the aggregated payload data 600 that may be generated by collection of different payloads aggregated from the network packets. The aggregated payload data 600 may include a header 602 and the artifact 604. The header 602 may contain information associated to the aggregated payload data 600 and the other data (e.g., such as length of payload, content, etc.).

Figure 7:
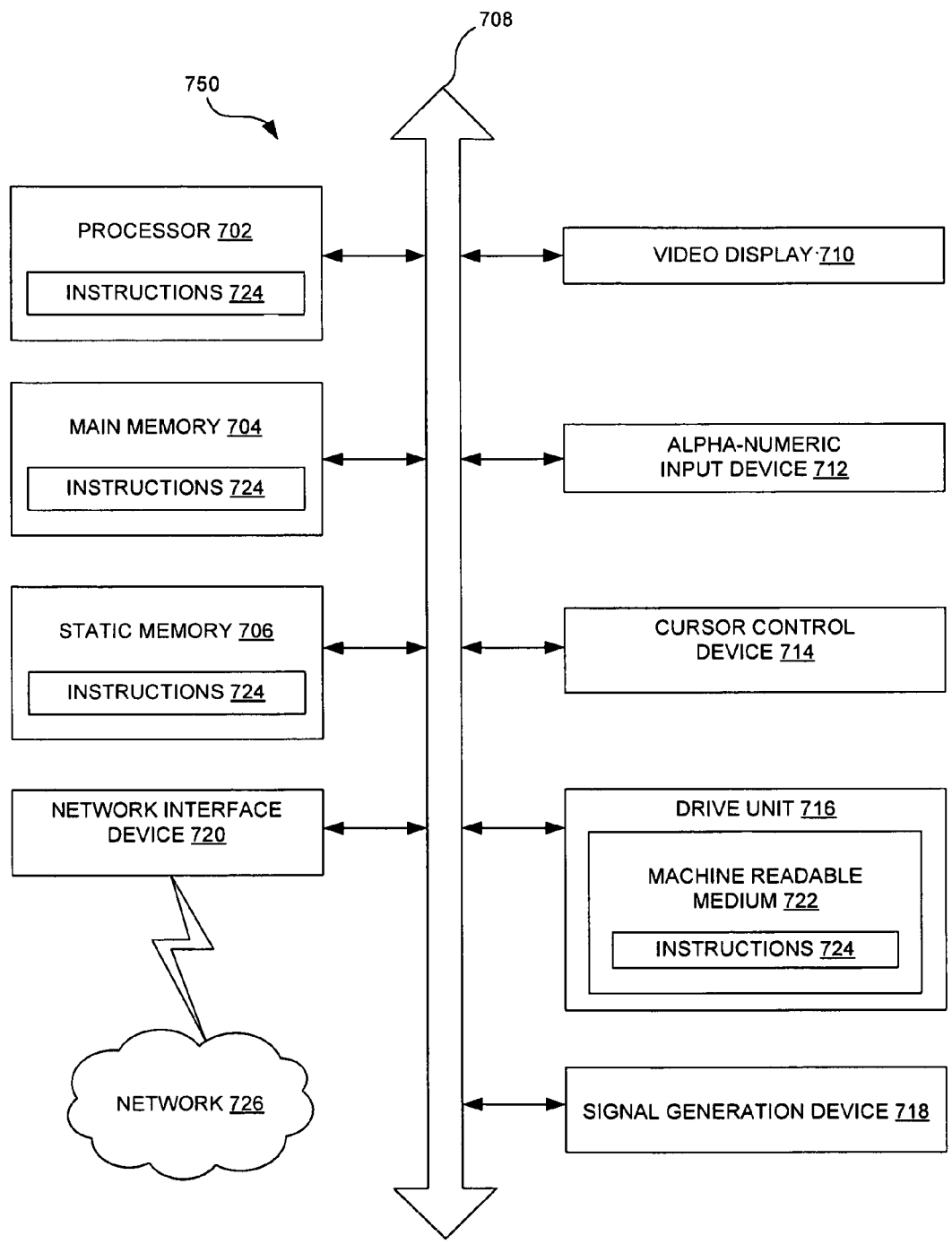
FIG. 7 is a diagrammatic system view of a data processing system in which any of the embodiments disclosed herein may be performed, according to one embodiment.

FIG. 7 is a diagrammatic system view of a data processing system in which any of the embodiments disclosed herein may be performed, according to one embodiment. Particularly, the diagrammatic system view 700 of FIG. 7 illustrates a processor 702, a main memory 704, a static memory 706, a bus 708, a video display 710, an alpha-numeric input device 712, a cursor control device 714, a drive unit 716, a signal generation device 718, a network interface device 720, a machine readable medium 722, instructions 724, and a network 726, according to one embodiment.

The diagrammatic system view 700 may indicate a personal computer and/or the data processing system in which one or more operations disclosed herein are performed. The processor 702 may be a microprocessor, a state machine, an application specific integrated circuit, a field programmable gate array, etc. (e.g., Intel® Pentium® processor). The main memory 704 may be a dynamic random access memory and/or a primary memory of a computer system.

The static memory 706 may be a hard drive, a flash drive, and/or other memory information associated with the data processing system. The bus 708 may be an interconnection between various circuits and/or structures of the data processing system. The video display 710 may provide graphical representation of information on the data processing system. The alpha-numeric input device 712 may be a keypad, a keyboard and/or any other input device of text (e.g., a special device to aid the physically handicapped).

The cursor control device 714 may be a pointing device such as a mouse. The drive unit 716 may be the hard drive, a storage system, and/or other longer term storage subsystem. The signal generation device 718 may be a bios and/or a functional operating system 106 of the data processing system. The network interface device 720 may be a device that performs interface functions such as code conversion, protocol conversion and/or buffering required for communication to and from the network 726. The machine readable medium 722 may provide instructions on which any of the methods disclosed herein may be performed. The instructions 724 may provide source code and/or data code to the processor 702 to enable any one or more operations disclosed herein.

Figure 8:
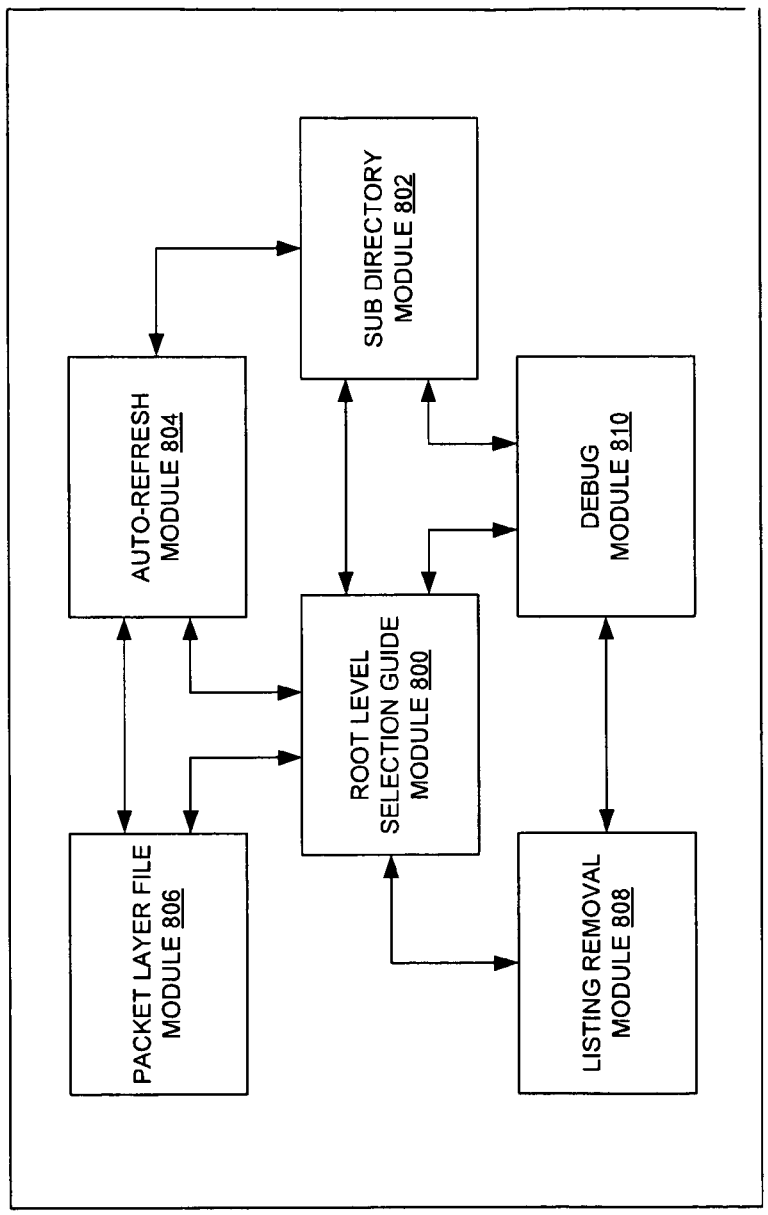
FIG. 8 is a system view of the network visibility module, according to one embodiment.

FIG. 8 is a system view of the network visibility module, according to one embodiment. Particularly, FIG. 8 illustrates a root level selection guide module 800, a sub-directory module 802, a auto-refresh module 804, a packet capture file module 806, a listing removal module 808, and a debug module 810, according to one embodiment.

The root level selection guide module 800 may form a root level selection guide based on a set of criteria associated with an activity through the network (e.g., using the MAC address, Ethernet, etc.) that is captured and/or stored on the storage device (e.g., in a database) associated with the virtual appliance 122. The sub-directory module 802 may form a sub-directory listing (e.g., destination IP address, etc.) based on a set of criteria associated with an activity (e.g., of the client device 106A-N of FIG. 1) through the network that is captured and/or stored on the storage device (e.g., in a database) associated with the virtual appliance 122.

The auto-refresh module 804 may refresh listings of a sub-directory (e.g., IP address, etc.) of the root level selection guide dynamically based on the activity through the network stored on the storage device when an option is selected in the root level selection guide. The packet capture file module 806 may create a packet capture file based on a current state of the activity through the network when one of the listings of the sub-directory of the root level selection guide is selected. The listing removal module 808 may remove certain ones of the listings when sliding windows of least recently used packets of the activity through the network are discarded from the storage device. The debug module 810 may debug in any inconsistencies found in root level selection guide module 800.

In an example embodiment, the root level selection guide module 800 may communicate with the sub-directory module 802, the auto-refresh module 804, the packet capture file module 806, listing removal module 808, and the debug module 810. The auto-refresh module 804 may communicate with the sub-directory module 802 and the packet capture file module 806. The debug module 810 may communicate with the listing removal module 808, and the sub-directory module 802, according to one embodiment.

Figure 9:
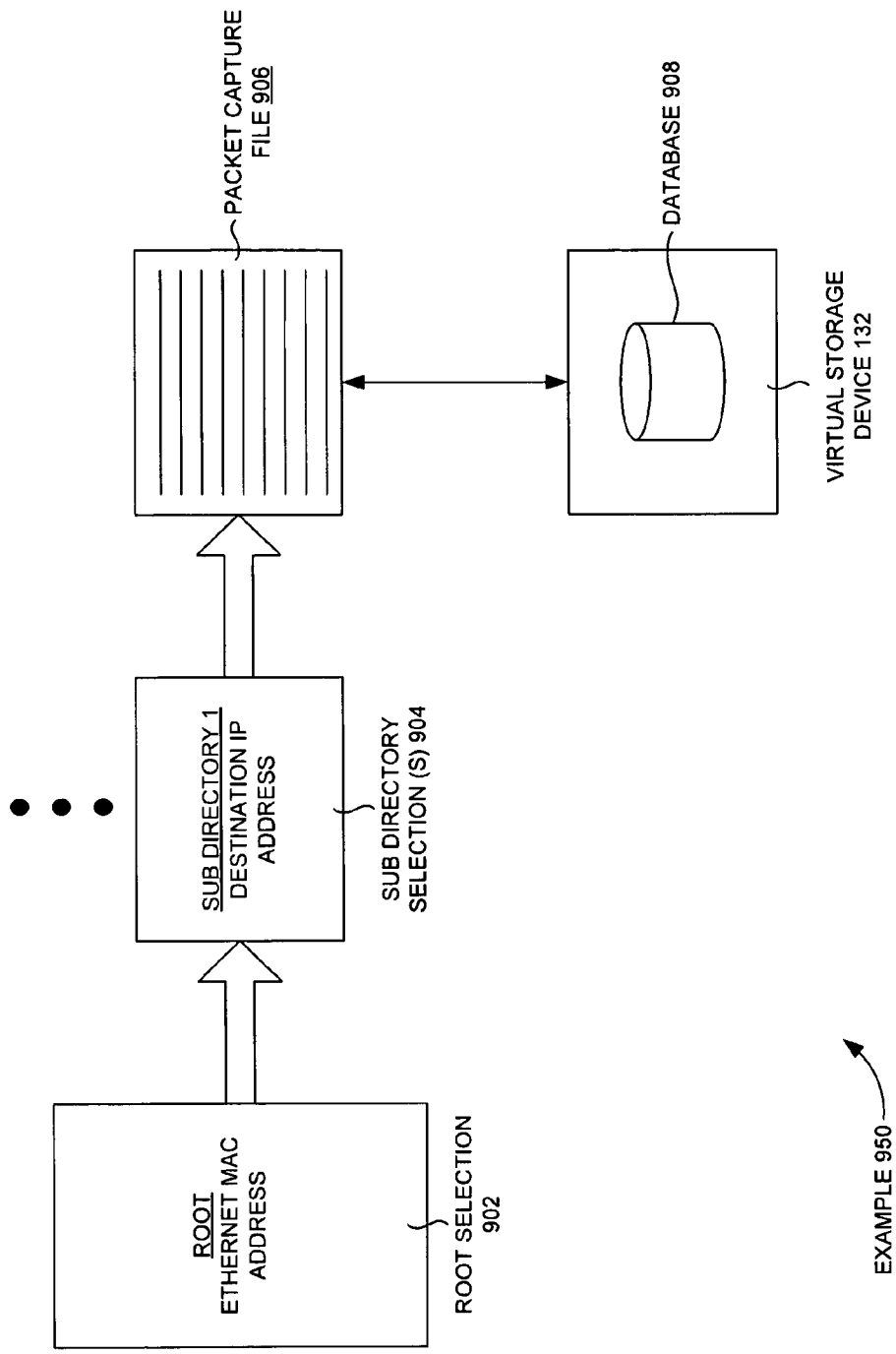
FIG. 9 is a flow diagram of creating a packet capture file, according to one embodiment.

FIG. 9 is a flow diagram of creating a packet capture file, according to one embodiment. In operation 902, the root selection guide may be formed based on a set of criteria associated with an activity through the network that is captured and/or stored on the storage device associated with the virtual appliance 122. In operation 904, listings of a sub-directory of the root level selection guide may be refreshed dynamically based on the activity through the network stored on the storage device when an option is selected in the root level selection guide. In operation 906, a packet capture file may be created based on a current state of the activity through the network when one of the listings of the sub-directory of the root level selection guide is selected.

An entity (e.g., a corporation, a university, an institution, a government, etc.) may enable individuals (e.g., employees) to access a content (e.g., a website, a document, a multimedia clip, etc.) through a virtual network (e.g., a set of virtual links between nodes of virtual machines (e.g., a software implementation of a computer that executes programs like a real machine) located in a physical host server) that is at least partially controlled by the entity (e.g., through a firewall, a gateway, the local area network, an access point, etc). The individuals may utilize an infrastructure (e.g., virtual routers, servers, virtual software switches, virtual and/or physical data processing systems, etc.) of the entity when accessing the content through the network.

The entity may have a set of rules (e.g., policies, procedures, regulations, security protocols, preferences, etc.) that govern how the virtual network is to be used by the individuals when they access the virtual network through the infrastructure. For example, the set of rules may be designed by the entity to protect security of information generated by employees of the entity (e.g., trade secrets being transmitted to competitors through web-based email systems). Alternatively, the set of rules may help to maintain productivity levels when the employees are at work (e.g., minimize non-work related web surfing). In other instances, the set of rules may help to ensure that a prohibited content (e.g., an unauthorized website) is not accessed by the individuals through the network controlled by the entity.

Thus, in order to monitor the traffic of the virtual network, the entity may employ a method and/or an apparatus. A packet (e.g., the packet 550 of FIG. 5) having a header (e.g., the header 502 of FIG. 5) and/or a payload (e.g., the payload 504 of FIG. 5) may be identified in a flow of a data through a virtual network. The header 502 of the packet may be classified in a type of the header. An algorithm that may determine an algorithm to extract a meta-data may have information relevant to virtual network traffic visibility may be based on the type of the header (e.g. as may performed by the header extraction module 206 of FIG. 2). The method may comprise extracting the meta-data from the header 502 may be extracted. The meta-data may be streamed to a storage device.

The meta-data may be stored in a database (e.g., the database 908 of FIG. 9) of the storage device, and/or the storage device may be limited in a storage capacity (e.g., to 16 terabytes of data). A least recently used algorithm may be applied to discard information from the storage device when storage device is limited in the storage capacity. The type of header may be an Ethernet header. At least one of an Ethernet source address, an Ethernet destination address, and/or an Ethernet protocol from the Ethernet header may be extracted as the meta-data of the Ethernet header. The flow of the data through the virtual network may be associated to a physical computing device associated with a user through the meta-data of the Ethernet header. The type of header may be an internet protocol header.

A data (e.g., a source IP address, a destination IP address, an IP protocol type, a sequence number, a flag, an acknowledgement number, a payload length from the internet protocol header, etc.) may be extracted as the meta-data of the internet protocol header. An entity on the virtual network (e.g., which website, which server, etc.) may be determined to have been accessed through the through the meta-data of the internet protocol header. How much total traffic was sent by a particular user of the virtual network in a session may be determined by analyzing the meta-data of the internet protocol header and/or other internet protocol headers. The internet protocol header may be at least one of an IPv4 internet protocol header and/or an IPv6 internet protocol header (e.g., as may performed by the IPV4 and/or IPV6 header modules of FIG. 2).

The type of the header may be a transfer control protocol (TCP) header. Information from the TCP header (e.g., a virtual and/or physical source port, a virtual and/or physical destination port, a sequence number, a payload length etc.) (e.g., as may performed by the TCP header module of FIG. 2) may be extracted as the meta-data of the TCP header. The kind of activity a particular user engaged in (e.g., web traffic, ftp, instant message traffic, etc.) may be determined through an analysis of the meta-data of the TCP header and/or other headers. An artifact (e.g., a file, a photo, etc.) may be reconstructed through an analysis of the meta-data of the TCP header.

The type of the header may be a user datagram protocol (UDP) header (e.g., as may performed by the UDP header module of FIG. 2). Information (e.g., the virtual and/or physical source port, the virtual and/or physical destination port, the sequence number, the payload length) may be extracted from the UDP header as the meta-data of the UDP header. A particular user may be determined to have engaged in an unauthorized activity (e.g., one line game playing, name server lookups, hacking, etc.) through an analysis of the meta-data of the UDP header and/or other headers. An artifact (e.g., a file, a photo, etc.) may be reconstructed through an analysis of the meta-data of the UDP header.

The type of the header may be an address resolution protocol (ARP) header. Information in the ARP header (e.g., a broadcast data) may be extracted as the meta-data of the ARP header. An analysis of the meta-data of the ARP header and/or other headers may be used to determine that a particular user engaged in (e.g., ARP poisoning, etc.) an unauthorized activity. The unauthorized activity (e.g., for attack prevention and/or attack detection) may be reconstructed through analysis of the meta-data of the ARP header.

The method may further comprise comprising storing the meta-data and/or other meta-data of the flow of virtual network data based on a compliance requirement (e.g., CALEA) (e.g., as may performed by the compliance module 208 of FIG. 2). The data of the virtual network may flow through a virtual and/or physical local area network.

The embodiments may be in a form of a machine-readable medium that embodies a set of instructions that, when executed by a machine, causes the machine to perform the methods herein described (e.g., the generic computer of FIG. 7).

The method and apparatus of the embodiment may comprise identifying a packet (e.g., the packet 550 of FIG. 5) having a header (e.g., the header 502 of FIG. 5) and/or a payload (e.g., the payload 504 of FIG. 5) in a flow of a data through a virtual network. The header (e.g., the header 502 of FIG. 5) of the packet 550 may be classified in a type of the header. An algorithm may be determined to extract a meta-data having information relevant to virtual network traffic visibility based on the type of the header. The meta-data from the header may be extracted. A storage device may be determined to not have the storage capacity to store the meta-data. A recently used data may be discarded when the storage device does not have capacity to store the meta-data such that a sliding window is formed in the storage device that discards the least recently used data when making room for the meta-data and/or future meta-data. The meta-data may be streamed to the storage device. The meta-data may be stored in a database (e.g., the database 908 of FIG. 9) of the storage device, and/or the storage device may be limited in a storage capacity (e.g., to 16 terabytes of data).

The type of header may be an Ethernet header. An information (e.g., an Ethernet source address, an Ethernet destination address, and/or an Ethernet protocol) may be extracted from the Ethernet header as the meta-data of the Ethernet header (e.g., as may performed by the Ethernet header module of FIG. 2). The flow of the data through the virtual network may be to a physical computing device associated with a user through the meta-data of the Ethernet header.

The method and apparatus of the embodiment may be a visibility module (e.g., the virtual appliance 122 of FIG. 1). The visibility module may comprise analysis module (e.g., the analysis module 204 of FIG. 2) to analyze a packet having a header and/or a payload in a flow of a data through the virtual network. The visibility module may include a type module (e.g., the type module 318 of FIG. 3) to classify the header of the packet in a type of the header. A classification module may determine an algorithm to extract a meta-data having information relevant to virtual network traffic visibility based on the type of the header. An extraction module (e.g., the extraction module 310 of FIG. 3) may extract the meta-data from the header. A streaming module may transfer the meta-data to a storage device. The meta-data may stored in a database (e.g., the database 908 of FIG. 9) of the storage device, and wherein the storage device is limited in a storage capacity (e.g., to 16 terabytes of data). A least recently used data module (e.g., the least recently used data module 202 of FIG. 2) may be used to apply a least recently used algorithm to discard information from the storage device when storage device is limited in the storage capacity. The data of the virtual network may flow through a virtual and/or physical local area network. The visibility module may have a storage appliance coupled to a virtual gateway (e.g., virtual router) of the virtual local area network.

An entity may not allow users to transmit/receive an artifact (e.g., Microsoft Word® document, digital photograph, etc.) having an unauthorized information (e.g., a trade secret, etc.) in an electronic transmission (e.g., e-mail, instant message, etc.) to a destination in a virtual network that is not controlled by the entity. For example, the entity may prohibit the transmission/reception of a file with a digital photographic image based solely on the content of that image (e.g., an offensive image).

The method and apparatus of the embodiment may comprise separating a payload data (e.g., the payload data 506 of FIG. 5) from a header data in a virtual network packet (e.g., the packet 550 of FIG. 5). The payload data 506 may be matched with an entry of a library of known artifacts (e.g., the library of known artifacts 322 of FIG. 3). A type of the payload data (e.g., the payload data 506 of FIG. 5) may be determined based on a match with the entry of the library of known artifacts 322. The payload data 506 from different virtual network packets may be aggregated to form an aggregated payload data (e.g., the aggregated payload data 600 of FIG. 5). The aggregated payload data 600 may be communicated as an extracted artifact to a user. The extracted artifact may be used to perform virtual network visibility analysis of a plurality of users on packets flowing across the virtual network, wherein the extracted artifact is at least one of a word processing document, a spreadsheet document, a database, an image, a video, a multimedia file, an email, an instant message communication and/or an audio file (e.g., as performed by the network visibility module 306 of FIG. 3). The entry may be validated as accurate by performing a deeper analysis of the payload data 506 with the entry of the library of known artifacts 322 (e.g., as performed by the validation module 314 of FIG. 3).

The payload data 506 may be determined to be encrypted (e.g., as may performed by the encrypted data processing module 300 of FIG. 3). An encrypted data processing module (e.g., the encrypted data processing module 300 of FIG. 3) of the virtual appliance may be applied to generate a request for the encrypted data from a source on behalf of a requester. A decryption key may be received from a source of the encrypted data. The encrypted data on the virtual network appliance may be decrypted using the decryption key. The type of the encrypted data may be determined based on the decryption.

The artifact may be determined to be complete. A portion of an incomplete artifact may be communicated to the user (e.g., as performed by the incomplete management module 320 of FIG. 3). A library of known artifacts (e.g., the library of known artifacts 322 of FIG. 3) may be formed by identifying markers found in data files stored in each instance of a particular type of artifact (e.g., the artifact 604 of FIG. 6). The payload data 506 may be a component of the extracted artifact 604. The markers may include at least one of start bits of the artifact, payload length of the artifact, a set of ending bits, and/or other identification bits found in each instance of the artifact.

The embodiment may be a system comprising a packet analyzer module (e.g., the packet analyzer module 304 of FIG. 3) that may be used to separate a payload data (e.g., the payload data 506 of FIG. 5) from a header data in a virtual network packet. An identification module (e.g., the identification module 312 of FIG. 3) may match the payload data 506 with an entry of a library of known artifacts (e.g., the library of known artifacts 322 of FIG. 3). A validation module (e.g., the validation module 314 of FIG. 3) may verify that that the entry is accurate by performing a deeper analysis of the payload data 506 with the entry of the library of known artifacts 322. A type module (e.g., the type module 318 of FIG. 3) may determine a type of the payload data 506 based on a match with the entry in the library of known artifacts 322.

A presentation module (e.g., the presentation module 308 of FIG. 3) may aggregate the payload data from different virtual network packets to form an aggregated payload data (e.g., the aggregated payload data 600 of FIG. 6). An extraction module (e.g., the extraction module 310 of FIG. 3) may communicate the aggregated payload data 600 as an extracted artifact to a user. A virtual network visibility module (e.g., the network visibility module 306 of FIG. 3) may perform virtual network visibility analysis of a plurality of users on packets flowing across the virtual network using the extracted artifact (e.g., a word processing document, a spreadsheet document, a database, an image, a video, a multimedia file, an email, an instant message communication and/or an audio file).

A determination module (e.g., the determination module 302 of FIG. 3) may determine that the payload data 506 is encrypted. An encrypted data processing module (e.g., the encrypted data processing module 300 of FIG. 3) may generate a request for the encrypted data from a source on behalf of a requester and/or may receive a decryption key on the virtual network appliance. A decrypted module (e.g., the decrypted module 316 of FIG. 3) to apply the decryption key to decrypt the encrypted data on the virtual network appliance. An incomplete management module (e.g., the incomplete management module 320 of FIG. 3) may determine that the artifact is incomplete, and/or may communicate at least a portion of the incomplete artifact to the user. A library formation module may create the library of known artifacts 322 by identifying markers found in data files stored in each instance of a particular type of artifact. The payload data 506 may be a component of the extracted artifact, (e.g., start bits of the artifact, payload length of the artifact, a set of ending bits, other identification bits found in each instance of the artifact).

A library of known artifacts (e.g., the library of known artifacts 322 of FIG. 3) may be formed by identifying markers found in data files stored in each instance of a particular type of artifact. At least one marker in a packet transmitted through a virtual network based on a match with the library. A type of a file associated with the packet may be determined based on the at least one marker (e.g., as performed by the type module 318 of FIG. 3). Relevant portions of the packet may be aggregated with other packets associated having the at least one marker to extract the file from the virtual network. The extracted file (e.g., a word processing document, a spreadsheet document, a database, an image, a video, a multimedia file, an email, an instant message communication and/or an audio file) may be used to perform virtual network visibility analysis of a plurality of users on data files flowing across the virtual network. The extracted file may be communicated to a user after reordering the packet and/or the other packets based on sequence numbers of each packet.

The data packet may be determined to be encrypted. An encrypted data processing module (e.g., the encrypted data processing module 300 of FIG. 3) may be applied to generate a request for the encrypted data from a source on behalf of a requester. An encryption key may be received on the virtual network appliance. The packet on the virtual network appliance may be decrypted using the decryption key (e.g., as may performed by the encrypted data processing module 300 of FIG. 3). The type of the encrypted file may be determined based on the decrypted data. The extracted file may be determined to be incomplete. A portion of the extracted file may be communicated to the user. The markers may include at least one of start bits of the artifact, payload length of the artifact, a set of ending bits, and/or other identification bits found in each instance of the artifact.

An entity may monitor activities of users of a portion of a virtual network that is controlled by the entity. The entity may store data (e.g., a meta-data, an artifact, a header information, etc.) regarding this activity in a database (a SQL database, a MySQL database, etc.). The entity may employ a supervisor to monitor activity of the users. The supervisor may require a report of a current and/or recent virtual network activity. Furthermore, the supervisor may require only a specific set of virtual network data (e.g., a history of websites visited by a particular user during a specific period of time, an analysis of a content of an artifact attached to an electronic transmission, etc.).

In order to monitor virtual network activity the method and apparatus of an embodiment may include a root level selection guide that may be formed based on a set of criteria associated with an activity through a virtual network that is captured and/or stored on a storage device associated with a virtual network appliance. The listings of a sub-directory of the root level selection guide may be refreshed dynamically based on the activity through the virtual network stored on the storage device when an option is selected in the root level selection guide (e.g., the auto-refresh module 804 of FIG. 8). A packet capture file based on a current state of the activity through the virtual network may be created when one of the listings of the sub-directory of the root level selection guide is selected.

A database (e.g., the database 908 of FIG. 9) having the activity through the virtual network may be automatically refreshed when creating the packet capture file (e.g., the auto-refresh module 804 of FIG. 8). The criteria may define parameters that indicate virtual network activity and which include at least one of an Ethernet source address, an Ethernet destination address, an Ethernet protocol from the Ethernet header, a source IP address, a destination IP address, an IP flag, a header length, an IP protocol, an IP options (e.g., out of bound messages, may depend on application), a payload length, a next header, a source port, a destination port, a sequence number, an acknowledgement number, a TCP flag, and/or a TCP option from the TCP header, and/or a broadcast data. The root level selection guide and/or the sub-directory of the root level selection guide may be arranged in a file system format in which selections of the set of criteria may define the packet capture file may be selected in a hierarchical fashion.

The packet capture file may include packet data associated with criteria based on selected ones of the root level selection guide and/or the sub-directory of the root level selection guide. The method may perform on at least one of the virtual network appliance and/or a data processing system communicatively coupled with the virtual network appliance. The virtual network appliance may continuously monitor activities of a plurality of users of the virtual network and/or places in the storage device relevant meta-data (e.g., header information such as source IP address, MAC address, destination IP address, etc.) and/or payload data 506 (e.g., artifacts such as files, video clips, audio files, etc.) that may be based on the monitoring of the activity through the virtual network. Certain ones of the listings may be removed when a sliding window of least recently used packets of the activity through the virtual network are discarded from the storage device (e.g., the listing removal module 808 of FIG. 8).

A root level selection guide may be formed based on a set of criteria associated with an activity through a virtual network that is captured and/or stored on a storage device associated with a virtual network appliance. A sub-directory of the root level selection guide having listings that may be dynamically refreshed may be based on the activity through the virtual network stored on the storage device when an option is selected in the root level selection guide. A packet capture file may be created based on a current state of the activity through the virtual network when one of the listings of the sub-directory of the root level selection guide is selected. A database (e.g., the database 908 of FIG. 9) that may be automatically referenced having the activity through the virtual network when creating the packet capture file.

The criteria defines parameters that may indicate virtual network activity and which may include at least one of an Ethernet source address, an Ethernet destination address, an Ethernet protocol from the Ethernet header, a source IP address, a destination IP address, an IP flag, a header length, an IP protocol, an IP options (e.g., out of bound messages, may depend on application), a payload length, a next header, a source port, a destination port, a sequence number, an acknowledgement number, a TCP flag, and/or a TCP option from the TCP header, and/or a broadcast data. The root level selection guide and/or the sub-directory of the root level selection guide may be arranged in a file system format in which selections of the set of criteria defining the packet capture file are selected in a hierarchical fashion. The packet capture file may include packet data associated with criteria based on selected ones of the root level selection guide and/or the sub-directory of the root level selection guide. The method may be performed on at least one of the virtual network appliance and/or a data processing system that may be coupled with the virtual network appliance.

The virtual network appliance may continuously monitor activities of a plurality of users of the virtual network and/or places in the storage device relevant meta-data (e.g., header information such as source IP address, MAC address, destination IP address, etc.) and/or payload data 506 (e.g., artifacts such as files, video clips, audio files, etc.) based on the monitoring of the activity through the virtual network. Certain ones of the listings may be removed when a sliding window of least recently used packets of the activity through the virtual network are discarded from the storage device.

A packet capture file that may be customized based on responses to a navigation of a file system by a user may be created. A directory of the file system may be formed based on information stored in a storage device having current and/or historical activity information of a plurality of users traversing a virtual network. The formed directories may be periodically refreshed based on changes in the information stored in the storage device. A root level selection guide of the directories may be formed based on a set of criteria associated with the current and/or historical activity through the virtual network that is captured and/or stored on the storage device. Listings of a sub-directory of the directories may be dynamically refreshed based on the activity through the virtual network stored on the storage device when an option is selected in the root level selection guide.

A database (e.g., the database 908 of FIG. 9) having the activity through the virtual network when creating the packet capture file may be automatically referenced. The criteria that may define parameters that may indicate virtual network activity and/or may include at least one of an Ethernet source address, an Ethernet destination address, an Ethernet protocol from the Ethernet header, a source IP address, a destination IP address, an IP flag, a header length, an IP protocol, an IP options (e.g., out of bound messages, may depend on application), a payload length, a next header, a source port, a destination port, a sequence number, an acknowledgement number, a TCP flag, and/or a TCP option from the TCP header, and/or a broadcast data. Certain ones of the formed directories may be removed when a sliding window of least recently used packets of the current and/or historical activity through the virtual network are discarded from the storage device.

The method and system of the embodiment may employ virtualization (e.g., the abstraction of computer resources). Virtualization may hide the physical characteristics of computing resources from a user (e.g., an application, an end user). This may include making a single physical resource (e.g., a server, an operating system, an application, or storage device) appear to function as multiple virtual resources. It may include making multiple physical resources (e.g., storage devices or servers) appear as a single virtual resource.

An entire network and/or an individual capability or component may be virtualized. An external interface may hides an underlying implementation (e.g., by multiplexing access, by combining resources at different physical locations, or by simplifying a control system).

Platform virtualization may simulate a computer. Resource virtualization may simulate combined, fragmented, and/or simplified resources. Virtualization may place an intermediary between the user and/or a provider and may act on both sides of the interface. It may provide the interface for the actual user and may consume the interface of the actual provider. This may be done either to allow a multiplicity of consumers to interact with one provider, or one user to interact with a multiplicity of providers, or both, with only the intermediary being aware of multiplicities.

Platform virtualization (e.g., emulation, simulation, native virtualization, hardware enabled virtualization, partial virtualization, paravirtualization, operating-system level virtualization, application virtualization, cross platform virtualization, etc.) may be performed on a given hardware platform by host software (e.g., a control program). The host software may create a simulated computer environment (e.g., a virtual machine 102 as in FIG. 1) for its guest software. The guest software (e.g., which is often itself a complete operating system) may run just as if it were installed on a stand-alone hardware platform. A virtual machine 102 may be simulated on a single physical machine. The simulation may support the guest's interfaces to devices (e.g., hard disk drive, network interface card).

Resource virtualization may virtualize specific system resources (e.g., storage volume, name space, network resources, etc.). Resource aggregation, spanning, and/or concatenation may combine individual components into larger resources or resource pools. Virtual memory (e.g., providing a different virtual address space for each application) may allow uniform, contiguous addressing of physically separate and/or non-contiguous memory and/or disk areas. RAID and/or volume managers may combine a plurality of disks into one large logical disk.

Storage virtualization may abstract logical storage from physical storage (e.g., storage area network (SAN)). The physical storage resources may aggregate into storage pools from which the logical storage may be created. Multiple independent storage devices may be scattered over a network and may appear to the user as a single, location-independent, monolithic storage device that may be managed centrally.

Channel bonding and/or network equipment may use multiple links combined to work as though they offered a single, higher-bandwidth link. Virtual Private Network (VPN), Network Address Translation (NAT), and/or similar networking technologies may create a virtualized network namespace within or across network subnets. I/O virtualization (e.g., the IBM Virtual I/O Server (VIOS)) (e.g., the ability to run an I/O device on a server at a specified time) may migrate the I/O device from server to server as needed.

The virtual machine (e.g., the virtual machine 102 of FIG. 1) may simulate the complete hardware. The virtual machine 102 may allow an unmodified "guest" operating system (OS) of a different CPU to run. This approach may be used to enable the creation of software for new processors before they were physically available. (e.g., Bochs®, PearPC®, PowerPC version of Virtual PC®, QEMU® without acceleration, and/or the Hercules® emulator). Emulation may be implemented using a variety of techniques (e.g., state machines, use of dynamic recompilation on a full virtualization platform, etc.).

The virtual machine 102 may simulate enough hardware to allow an unmodified "guest" OS (e.g., one designed for the same CPU) to be run in isolation (e.g., Parallels Workstation, Parallels Desktop for Macintosh®, VirtualBox, Virtual Iron, Virtual PC, Virtual Server, VMware Workstation®, VMware Server®, QEMU, Adeos, Mac-on-Linux, Win4BSD, Win4Lin Pro, and/or Egenera vBlade® technology). The hardware may provide architectural support that may facilitate building a virtual machine (e.g., the virtual machine 102 of FIG. 1) monitor and may allow a guest OS to be run in isolation (e.g., Linux KVM, VMware® Workstation, VMware® Fusion, Microsoft® Virtual PC, Xen, Parallels Desktop for Mac, and/or Parallels Workstation). The virtual machine may simulates multiple instances of an underlying hardware environment (e.g., an address space). Such an environment may support resource sharing and/or process isolation. A physical server may be virtualized at the operating system level. A software virtualization layer may be used to encapsulate a desktop or server application from the local operating system.

An application may be compiled for a specific CPU and/or operating system on a platform with a different CPU and/or operating system, without modification to source code or binaries (e.g., Apple® Rosetta, IBM® PowerVM Lx86 and/or Transitive QuickTransit).

Computer clusters, grid computing, and/or virtual servers may be used to combine multiple discrete computers into larger meta-computers. Partitioning may be used to split a single resource (e.g., a disk space, network bandwidth) into a number of resources of the same type. Encapsulation may be used to hide resource complexity by the creation of a simplified interface (e.g., a CPU may be incorporated to cache memory or pipeline to improve performance).

A system virtual machine (e.g., hardware virtual machine) may allow the multiplexing of the underlying physical machine between different virtual machines, each running its own operating system. A hypervisor may run on a bare hardware (e.g., Type 1, native virtual machine) or on top of an operating system (e.g., Type 2, hosted virtual machine). Multiple virtual machines may each running their own operating system (e.g., a guest operating system) that may be used in server consolidation (e.g., a different services that used to run on individual machines in order to avoid interference, are instead run in separate virtual machines on the same physical machine. This use is may be called quality-of-service isolation (QoS isolation).

Full virtualization (e.g., a virtualization technique used to implement a certain kind of virtual machine environment) may be used to provide a complete simulation of the hardware of a computer network. Software may be capable of execution on the raw hardware run in the virtual machine 102.

Virtual infrastructure may be used to create an abstracted network device called virtual software switches (e.g., VMware's vSwitch) (e.g., the virtual software switch of FIG. 1). A virtual software switch may route traffic internally between virtual machines and/or link to external networks. A plurality of virtual software switches may reside in a single host. A virtual software switch may combine the bandwidth of multiple network adapters and/or balance communications traffic among them. They may be configured to handle physical NIC failover. A virtual software switch may model a physical Ethernet switch. A virtual software switch may connect one network adapter of a virtual machine (e.g., the virtual machine 102 of FIG. 1) to each port. Each uplink adapter associated with a virtual software switch may use one port. Each logical port on the virtual software switch may be a member of a single port group. Each virtual software switch may have one or more port groups assigned to it. A set of virtual machines (the virtual machine 102, 108, and/or 114 of FIG. 1) may be configured with a virtual software switch to a network (e.g., WAN, LAN, virtual network, etc.). Virtual network traffic between a set of virtual machines connected to the virtual software switch may be routed locally. An uplink adapter may be connected to a virtual software switch and may allow a virtual machine to access an external network (e.g., the external network 126 of FIG. 1). A virtual software switch may be in promiscuous mode. An entity may monitor the virtual network by tapping into the virtual software switch. Information (e.g., data packets) may be obtained by tapping the virtual software switch. This information may be regenerated out into a physical network for external communication (e.g., the traffic regenerator 124 of FIGS. 1 and 2). A virtual software switch may be configured to perform a tapping function that may capture network traffic for network visibility. The virtual software switch may be a virtual span port.

A virtual network may be a network of virtual machines running on a single physical machine that are connected logically to each other so that they may send data to and/or receive data from each other. A virtual server machine has multiple virtual machines in it. An application and/or database make work in the virtual machine 102. A virtual machine 102 may be connected to a set of virtual networks. Each virtual network may be serviced by a single virtual software switch. A virtual network may be connected to a physical network by associating one or more physical adapters (e.g., uplink adapters) with the virtual network's virtual software switch. A virtual machine 102 may be connected to the virtual network may be able to access the physical networks connected to the uplink adapters when one or more uplink adapters are associated with the virtual software switch A virtual software switch may work like a physical switch. It may detect which virtual machines are logically connected to each of its virtual ports and may use that information to forward traffic to the correct virtual machine 102. A virtual software switch may be connected to physical switches using physical adapters (e.g., uplink adapter), and/or may join virtual networks with physical networks. This type of connection may be similar to connecting physical switches together to create a larger network.

A virtual software switch may have the advanced functionality of a physical switch (e.g., turn some particular port range on or off, link speed and/or duplex settings priority settings for ports, MAC filtering and/or other types of "port security" features which prevent MAC flooding, use of Spanning Tree Protocol, SNMP monitoring of device and/or link health, port mirroring, link aggregation, VLAN settings, 802.1X network access control).

A physical and/or virtual port group may specify port configuration options such as bandwidth limitations and/or VLAN tagging policies for each member port. Network services may connect to virtual software switch through physical and/or virtual port groups. A physical and/or virtual port groups may define how a connection is made through the virtual software switch to the physical and/or virtual network. One or more physical and/or virtual port groups may be associated with a single virtual software switch.

NIC teaming may occur when multiple uplink adapters are associated with a single virtual software switch to form a team. A team may share the load of traffic between physical and/or virtual networks among some or all of its members and/or provide passive failover in the event of a hardware failure or a network outage. A VLAN may enable a single physical LAN segment to be further segmented so that groups of ports may be isolated from one another as if they were on physically different segments.

The TCP/IP networking stack supports iSCSI, NFS. Virtual machines run their own systems' TCP/IP stacks, and/or connect at the Ethernet level through virtual software switches. Two new features in ESX Server 3, iSCSI and/or NFS, are referred as IP storage in this chapter. IP storage refers to any form of storage that uses TCP/IP network communication as its foundation. iSCSI may be used as a virtual machine datastore, and/or NFS may be used as a virtual machine datastore and/or for direct mounting of ISO files, which are presented as CD-ROMs to virtual machines. Migration with may enable a powered on virtual machine 102 to be transferred from one host to another without shutting down the virtual machine 102.

Figure 10:
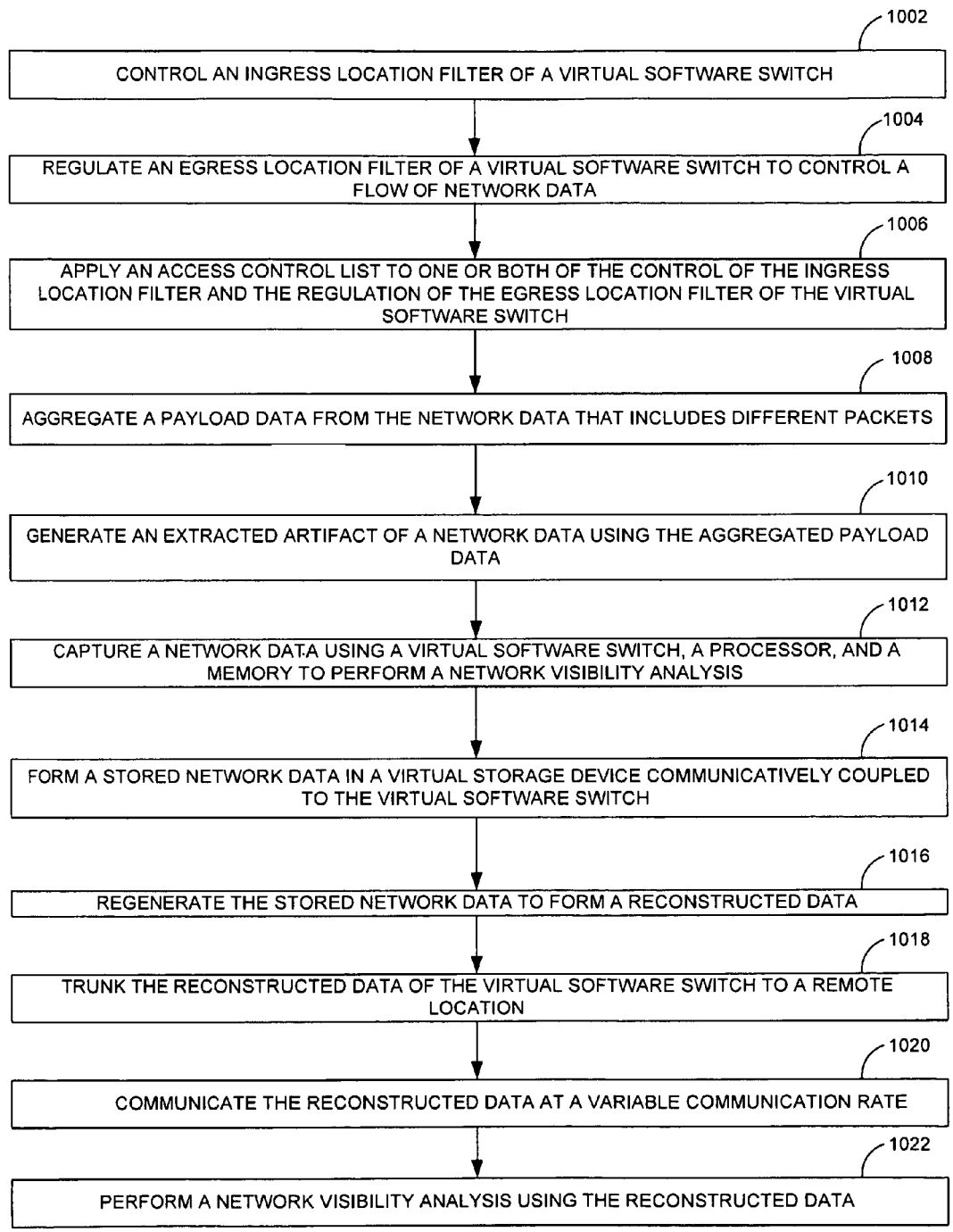
FIG. 10 is a process flow illustrating filtering and communication of the network data between the virtual software switch and a remote port using a network trunk, according to one embodiment.

FIG. 10 is a process flow illustrating control of a virtual switch to perform a network visibility analysis, according to one embodiment. In operation 1002, an ingress location filter of a virtual software switch is controlled. In operation 1004, an egress location filter of a virtual software switch is regulated to control a flow of network data. In operation 1006, an access control list is applied to one or both of the control of the ingress location filter and the regulation of the egress location filter of the virtual software switch. In operation 1008, a payload data is aggregated from the network data that includes different packets. In operation 1010, an extracted artifact of a network data is generated using the aggregated payload data. In operation 1012, a network data is captured using a virtual software switch, a processor, and a memory to perform a network visibility analysis. In operation 1014, a stored network data is formed in a virtual storage device communicatively coupled to the virtual software switch. In operation 1016, the stored network data is regenerated to form a reconstructed data. In operation 1018, the reconstructed data of the virtual software switch is trunked to a remote location. In operation 1020, the reconstructed data is communicated at a variable communication rate. In operation 1022, a network visibility analysis is performed using the reconstructed data.

Figure 11:
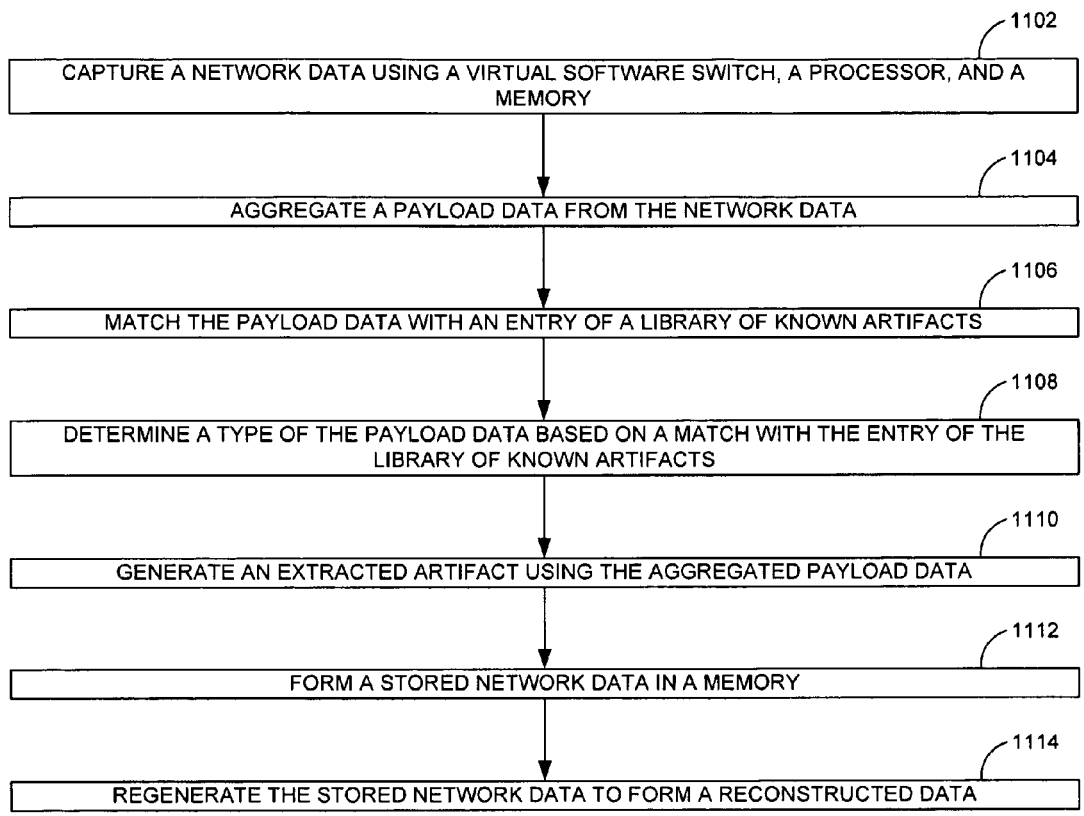
FIG. 11 is a process flow illustrating capturing and regenerating the stored network data to form a reconstructed data using a virtual software switch, according to one embodiment.

FIG. 11 is a process flow illustrating capturing and regenerating the stored network data to form a reconstructed data using a virtual software switch, according to one embodiment. In operation 1102, a network data is captured using a virtual software switch, a processor, and a memory. In operation 1104, a payload data is aggregated from the network data. In operation 1106, the payload data is matched with an entry of a library of known artifacts. In operation 1108, a type of the payload data is determined based on a match with the entry of the library of known artifacts. In operation 1110, an extracted artifact is generated using the aggregated payload data. In operation 1112, a stored network data is formed in a memory. In operation 1114, the stored network data is regenerated to form a reconstructed data.

Although the present embodiments have been described with reference to specific example embodiments, it will be evident that various modifications and/or changes may be made to these embodiments without departing from the broader spirit and/or scope of the various embodiments. For example, a combination of software and/or hardware may be used to enable the viral growth extension through recommendation optimization in online communities disclosed herein to further optimize function.

It will be appreciated that the various operations, processes, and methods disclosed herein may be embodied in a machine-readable medium and/or a machine accessible medium compatible with a data processing system (e.g., a computer system), and may be performed in any order.

The structures and/or modules in the figures are shown as distinct and communicating with only a few specific structures and not others. The structures may be merged with each other, may perform overlapping functions, and may communicate with other structures not shown to be connected in the Figures. Accordingly, the specification and drawings are to be regarded in an illustrative rather than a restrictive sense.

The invention claimed is:

1. A method, comprising:
capturing a network data using a virtual software switch, a processor, and a memory, wherein the network data is communicated to at least one port of the virtual software switch;
forming a stored network data in a memory;
regenerating the stored network data to form a reconstructed data;
performing a network visibility analysis using the reconstructed data;
aggregating a payload data from the network data, wherein the network data comprises a plurality of different packets; and
generating an extracted artifact of a network data using the aggregated payload data.

2. The method of claim 1, further comprising:
communicating the reconstructed data at a variable communication rate.

3. The method of claim 2, further comprising:
controlling an ingress location filter of a virtual software switch.

4. The method of claim 3, further comprising:
regulating an egress location filter of a virtual software switch to control a flow of network data.

5. The method of claim 3, further comprising:
applying an access control list to at least one of the control of the ingress location filter and the regulation of the egress location filter of the virtual software switch.

6. The method of claim 1, further comprising:
communicating the reconstructed data at an upper threshold rate.

7. The method of claim 1, further comprising:
communicating the reconstructed data at an lower threshold rate.

8. The method of claim 1, further comprising:
communicating the reconstructed data at an intermittent rate.

9. The method of claim 1, wherein the memory is comprised of a virtual storage device communicatively coupled to the virtual software switch.

10. The method of claim 9, further comprising:
trunking the reconstructed data of the virtual software switch to a remote location.

11. The method of claim 10, wherein the reconstructed data is communicated to at least one of a physical network and a virtual network.

12. The method of claim 1, further comprising:
matching the payload data with an entry of a library of known artifacts; and
determining a type of the payload data based on a match with the entry of the library of known artifacts.

13. The method of claim 1, wherein the extracted artifact is comprised of at least one of a word processing document, a spreadsheet document, a database, an image, a video, a multimedia file, an email, an instant message communication, an audio file, a compressed file, an executable file, a web page, a raw data, a metadata, and a presentation.

14. The method of claim 1, wherein a machine is caused to perform the method of claim 1 when a set of instructions are executed by the machine, wherein the set of instructions is embodied by the method of claim 1 in a form of a machine-readable medium.

15. A system, comprising:
a virtual software switch to capture a network data using a processor and a memory, wherein the network data is captured to perform a network visibility analysis and the network data is communicated to at least one port of the virtual software switch;
an additional memory to store the network data;
a regeneration module to form a reconstructed data using the stored network data;
a virtual appliance to aggregate a payload data from the network data, wherein the network data comprises a plurality of different packets; and
an extraction module to form an extracted artifact using the aggregated payload data.

16. The system of claim 15, wherein the extracted artifact is comprised of at least one of a word processing document, a spreadsheet document, a database, an image, a video, a multimedia file, an email, an instant message communication, an audio file, a compressed file, an executable file, a web page, a raw data, a metadata, and a presentation.

17. The system of claim 15, wherein the reconstructed data is formed using a variable communication rate.

18. The system of claim 17, wherein the variable communication rate is comprised of at least one of a real time, an upper rate, a lower rate, and a customizable rate.

19. The system of claim 18, further comprising:
a transferable control module to filter the network data using at least one of an ingress location and an egress location of the virtual software switch.

20. A method, comprising:
capturing a network data using a virtual software switch, a processor, and a memory, wherein the network data is captured to perform a network visibility analysis and the network data is communicated to at least one port of the virtual software switch;
aggregating a payload data from the network data, wherein the network data is comprised of different packets;
generating an extracted artifact using the aggregated payload data, wherein the extracted artifact is comprised of at least one of a word processing document, a spreadsheet document, a database, an image, a video, a multimedia file, an email, an instant message communication, an audio file, a compressed file, an executable file, a web page, a raw data, a metadata, and a presentation;
forming a stored network data using the network data in a virtual storage device communicatively coupled to the virtual software switch; and
regenerating the stored network data to form a reconstructed data, wherein the reconstructed data is formed using a variable communication rate comprised of at least one of a real time, an upper rate, a lower rate, and a customizable rate, and wherein the reconstructed data is communicated to at least one of a physical network and a virtual network.

21. The method of claim 20, further comprising:
filtering the network data using at least one of an ingress location and an egress location of the virtual software switch, wherein an access control list is used to control a filter of at least one of the ingress location and the egress location;
matching the payload data with an entry of a library of known artifacts;
determining a type of the payload data based on a match with the entry of the library of known artifacts; and
communicating the network data between the virtual software switch and a remote port using a network trunk.

* * * * *